United States Patent
Tran (10) Patent No.: US 12,001,848 B2
(45) Date of Patent: Jun. 4, 2024

(54) MICROPROCESSOR WITH TIME COUNTER FOR STATICALLY DISPATCHING INSTRUCTIONS WITH PHANTOM REGISTERS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 211 days.

(21) Appl. No.: 17/704,614

(22) Filed: Mar. 25, 2022

(65) Prior Publication Data

US 2023/0273796 A1 Aug. 31, 2023

Related U.S. Application Data

(63) Continuation-in-part of application No. 17/588,315, filed on Jan. 30, 2022, now Pat. No. 11,829,187.

(51) Int. Cl.
*G06F 9/38* (2018.01)
*G06F 9/22* (2006.01)
*G06F 9/30* (2018.01)
*G06F 9/48* (2006.01)

(52) U.S. Cl.
CPC ............ *G06F 9/3869* (2013.01); *G06F 9/223* (2013.01); *G06F 9/30141* (2013.01); *G06F 9/4825* (2013.01)

(58) Field of Classification Search
CPC .......................... G06F 9/3836; G06F 9/30145
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |

(Continued)

FOREIGN PATENT DOCUMENTS

| | | |
|---|---|---|
| EP | 0840213 A2 | 5/1998 |
| EP | 0959575 A1 | 11/1999 |

(Continued)

OTHER PUBLICATIONS

U.S. Appl. No. 17/713,569, filed Apr. 5, 2022, Thang Minh Tran, Entire Document.

(Continued)

*Primary Examiner* — Zachary K Huson
(74) *Attorney, Agent, or Firm* — Appleton Luff (57) ABSTRACT

A processor includes a time counter and provides a method for statically dispatching fused instructions with first operation and second operation with preset execution times for forwarding of result data from the first operation to the second operation without writing to a register, and where the preset execution times are based on a time count from the time counter provided to an execution pipeline.

23 Claims, 6 Drawing Sheets

(56) References Cited

U.S. PATENT DOCUMENTS

| | | |
|---|---|---|
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,393 A | 3/2000 | Glew et al. |
| 6,065,105 A | 5/2000 | Zaidi et al. |
| 6,247,113 B1 | 6/2001 | Jaggar |
| 6,282,634 B1 * | 8/2001 | Hinds ................ G06F 9/3455 712/210 |
| 6,304,955 B1 | 10/2001 | Arora |
| 6,425,090 B1 | 7/2002 | Arimilli et al. |
| 6,453,424 B1 | 9/2002 | Janniello |
| 7,069,425 B1 | 6/2006 | Takahashi |
| 7,434,032 B1 * | 10/2008 | Coon ................ G06F 9/3851 712/217 |
| 8,166,281 B2 | 4/2012 | Gschwind et al. |
| 9,256,428 B2 | 2/2016 | Heil et al. |
| 11,132,199 B1 | 9/2021 | Tran |
| 11,144,319 B1 | 10/2021 | Battle et al. |
| 11,163,582 B1 | 11/2021 | Tran |
| 11,204,770 B2 | 12/2021 | Tran |
| 11,263,013 B2 | 3/2022 | Tran |
| 2001/0004755 A1 | 11/2001 | Levy et al. |
| 2003/0135712 A1 | 7/2003 | Theis |
| 2006/0010305 A1 | 1/2006 | Maeda et al. |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1 * | 12/2006 | Lewis ................ G06F 9/3869 712/220 |
| 2007/0260856 A1 | 11/2007 | Tran et al. |
| 2011/0099354 A1 | 4/2011 | Takashima et al. |
| 2011/0320765 A1 | 12/2011 | Karkhanis et al. |
| 2012/0047352 A1 | 2/2012 | Yamana |
| 2013/0151816 A1 * | 6/2013 | Indukuru ............ G06F 9/3836 712/206 |
| 2013/0297912 A1 | 11/2013 | Tran et al. |
| 2013/0346985 A1 | 12/2013 | Nightingale |
| 2014/0082626 A1 | 3/2014 | Busaba et al. |
| 2015/0227369 A1 | 8/2015 | Gonion |
| 2016/0092238 A1 | 3/2016 | Codrescu et al. |
| 2016/0371091 A1 | 12/2016 | Brownscheidle et al. |
| 2017/0357513 A1 | 12/2017 | Ayub et al. |
| 2018/0196678 A1 | 7/2018 | Thompto |
| 2020/0004543 A1 | 1/2020 | Kumar et al. |
| 2020/0387382 A1 * | 12/2020 | Tseng ................ G06F 9/30185 |
| 2021/0026639 A1 | 1/2021 | Tekmen et al. |
| 2021/0311743 A1 | 10/2021 | Tran |
| 2023/0068637 A1 | 3/2023 | Feiste et al. |
| 2023/0244490 A1 | 8/2023 | Tran |
| 2023/0244491 A1 | 8/2023 | Tran |

FOREIGN PATENT DOCUMENTS

| | | |
|---|---|---|
| WO | 0010076 A1 | 2/2000 |
| WO | 0213005 A1 | 2/2002 |

OTHER PUBLICATIONS

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

PCT/US23/27497: Written Opinion of the International Searching Authority.

Written Opinion of the International Searching Authority, PCT/S2022/052185.

Written Opinion of the International Searching Authority, PCT/US2023/018970.

Written Opinion of the International Searching Authority, PCT/US2023/018996.

\* cited by examiner

MICROPROCESSOR WITH TIME COUNTER FOR STATICALLY DISPATCHING INSTRUCTIONS WITH PHANTOM REGISTERS

RELATED APPLICATIONS

This application is a continuation-in-part of and claims priority to U.S. patent application Ser. No. 17/588,315, filed Jan. 30, 2022, and entitled "Microprocessor with Time Counter for Statically Dispatching Instructions," which application is hereby incorporated by reference in its entirety.

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

An alternative to OOO superscalar processors is very-long-instruction-word (VLIW) processors. These have diminished interest in the industry because of the need for a complex compiler and relatively weak performance. Another technique to improve performance and reduce the instruction code size is fusing of instructions which can be done in software. The fused instruction can be executed by creating a new fused functional unit or be broken to micro-operations during instruction decode where a first micro-operation writes to a temporary register and a second, subsequent, micro-operation reads from the temporary register. The temporary registers must be added and maintained by the processor. Registers however are a scarce resource especially for vector processors where the register width can be thousands of bits.

Thus, there is a need for an OOO superscalar microprocessor which consumes less power, has a simpler design, and is scalable with consistently high performance. There is also a need for efficiently executing fused instructions.

SUMMARY

The disclosed embodiments provide a processor with a time counter and a method for statically dispatching instructions to an execution pipeline with preset execution times based on a time count from the counter. In one embodiment a processor includes a time counter which stores a time count incremented every clock cycle representing a current time of the processor, an instruction issue unit for receiving a first instruction and issuing the first instruction with a preset execution time based on the time count, and an execution queue for receiving the first instruction from the instruction unit and dispatching the first instruction to a functional unit when the preset execution time is the same as the time count. In another embodiment the instruction issue unit receives a second instruction with read-after-write data dependency with the first instruction and issues the second instruction to an execution queue with a second preset execution time based on data forwarding from the first instruction and dispatches the second instruction to a functional unit when the second preset execution time is the same as the time count. In this case, the first instruction can forward data directly to the second instruction without using a destination register or a write port to a register file for the first instruction. Since registers in the register file and the write ports to the register file are scarce resources, execution of instructions without using a destination register or a write port improves performance and saves power.

A disclosed approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments every clock cycle and the resulting count is used to statically schedule instruction execution. Instructions have known throughput and latency times, and thus can be scheduled for execution based on the time count. For example, a multiply instruction with throughput time of 1 and latency time of 3 can be scheduled to execute when the data dependency is resolved. If the time count is 5 and the multiply has no data dependency at time 8, then the available read buses are scheduled to read data from the register file at time 8, the available multiply unit is scheduled to execute the multiply instruction at time 9, and the available write bus is scheduled to write result data from multiply unit to the register file at time 11. The multiply instruction is dispatched to the multiply execution queue with the preset execution times. The read buses, the multiply unit, and the write bus are scheduled to be busy at the preset times. The maximum time count is designed to accommodate the largest future time to schedule execution of instruction. In some embodiments, the time count is 64 and no instruction can be scheduled to execute more than 64 cycles in the future. In another embodiment a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for data dependency are eliminated. The basic out-of-order execution of instructions operates similarly to that of a conventional out-of-order processor, but statically scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

BRIEF DESCRIPTION OF THE DRAWINGS

Aspects of the present invention are best understood from the following description when read with the accompanying figures.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

Figure 1:
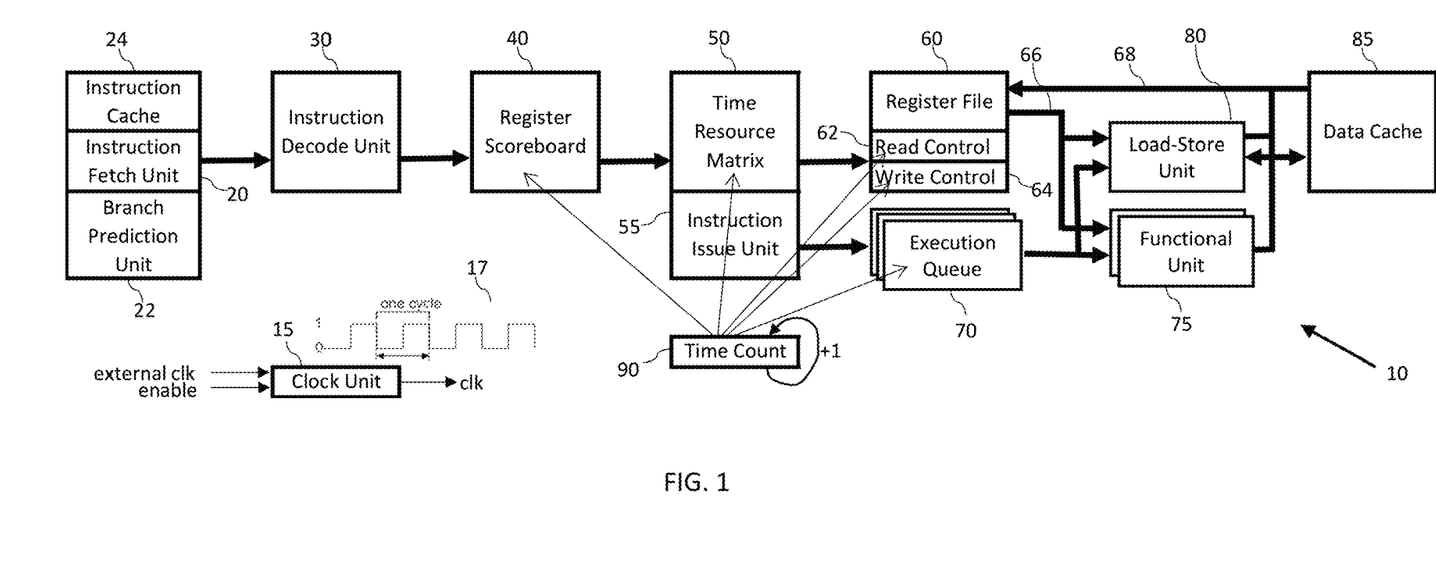
FIG. 1 is a block diagram illustrating a processor based data processing system in accordance with present invention.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register scoreboard 40, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 provide a handy to synchronize many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be execute in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time setup by the decode/issue unit. The preset time is future time based on the time count, so when the time count is counts up to the preset time, then the specified action will happen, where the specified action is reading data from the register file, writing data to the register file, or issuing instruction to a functional unit for execution. The decode/issue unit 30 determines that the instruction is free of data dependency and the resource is available to set the "preset time" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical of memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register scoreboard 40. The instruction decode unit 30 decodes the instructions for instruction type, instruction throughput and latency times, and the register operands. The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

One embodiment supports formation of a custom instruction by merging two existing instructions where the result data of the first instruction is forwarded to a second instruction without using the scarce resource of register and write port 68 to the register file 60. This is helpful in, for example, the RISC-V instruction set architecture (ISA) in which some opcode fields are reserved for custom instructions. The custom instruction, which can be generated by a compiler, is supported in the disclosed embodiment by "fusing" instructions in hardware. An example of a fused instruction is a multiply-accumulate instruction. The compiler option has the advantage of increased code density where two instructions are replaced with a single fused instruction. In the following description, the term "fused instruction" is used to refer to the custom instruction which consists of a first micro-operation (or first micro-op) corresponding to a first instruction and a second, subsequent, micro-operation (or second micro-op) corresponding to a second instruction. In a normal case, the first instruction writes result data to a destination register in the register file 60 and the second instruction has read-after-write data dependency with the first instruction. The second instruction retrieves the source operand data by reading the contents of the register from register file 60 or forwarding the result data from the functional unit of the first instruction. For a fused instruction, the first micro-op does not write result data back to the register file 60 and the second micro-op receives only data forwarded from the functional unit of the first micro-op. In one embodiment, the first micro-op writes result data to a phantom register and the second micro-op reads data from the phantom register to establish the read-after-write data dependency of the second micro-op to create the data forwarding path from the functional unit of the first micro-op to the functional unit of the second micro-op. As used herein, the term "phantom register" does not refer to an actual register, such as a temporary register that is used to pass data from one functional unit to another functional unit. Instead, the term "phantom register" refers to a mechanism in static scheduling to pass data from one functional unit to another functional unit without using any temporary register and is explained in further detail in connection with FIG. 4A.

Figure 2:
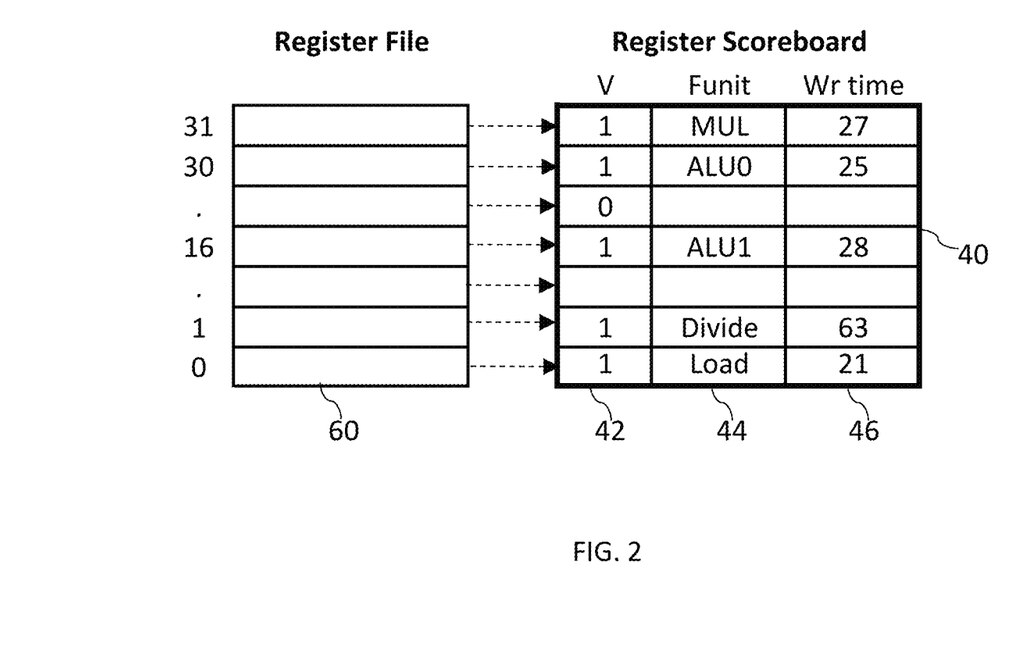
FIG. 2 is a block diagram illustrating a register file and a register scoreboard.

FIG. 2 illustrates the register file 60 and the register scoreboard 40. In one embodiment, the register file 60 has 32 registers, numbered as registers 0 to 31 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 2, register 0 is written back at time count 21 from the load-store unit 80. Register 1 is written back at time count 63 from the divide unit (one of the functional units 75). Register 16 is written back at time count 28 from the ALU1, (another of the functional units 75), etc. as illustrated in FIG. 2. The write time 46 is the time in reference to the time count 90. The result data is written to the register file 60. The data is not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register file 60.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 and can be accessed at any time providing availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 for availabilities of the resources.

Figure 3:
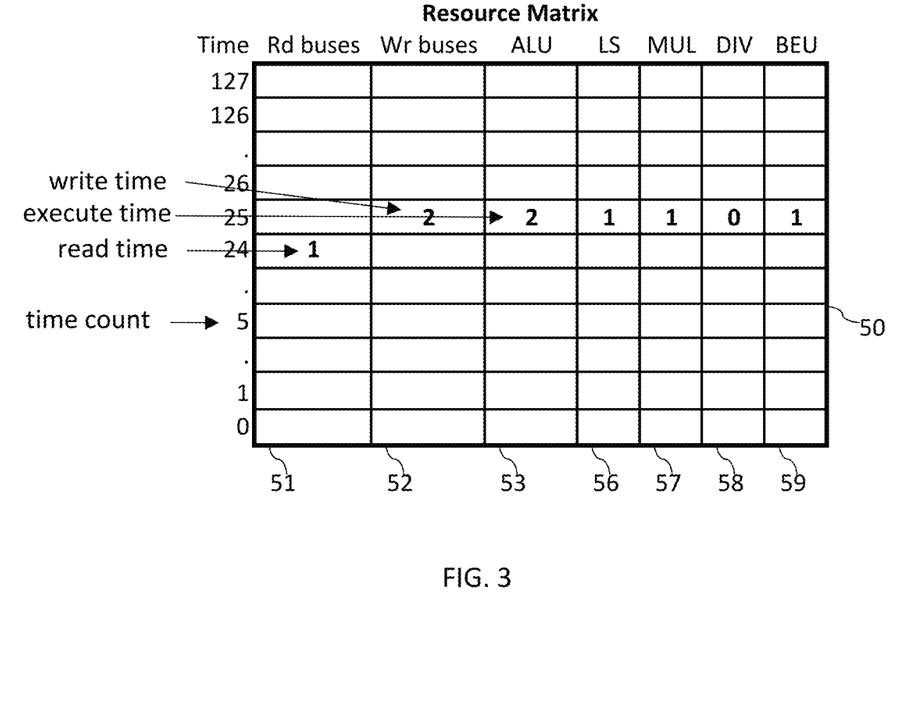
FIG. 3 is a block diagram illustrating a time-resource matrix.

FIG. 3 illustrates the time-resource matrix 50. The time-resource matrix 50 preferably includes the same number of time entries to match the time counter 90. For example, if the time counter 90 is 128 cycles, then the time-resource matrix 50 has 128 entries. The time counter is incremented every clock cycle and rotates back from the 127th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, and 1 BEU for execution of instruction. At write time 25, there are 2 available write buses.

All available resources for the required times are read from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instruction in the instruction issue unit 55.

In one embodiment, the first micro-op of the fused instruction does not have any assigned destination register and write port. The write time 46 of the register scoreboard 40 is used only for forwarding to the second micro-op. The first micro-op checks the write buses 52 of the time-resource matrix 50 for availability of write buses. In order to ensure that the second micro-op will receive the forwarding data, the first and second micro-ops must check for available resources from the time-resource matrix 50 at the same time. The read time and execution time of the first micro-op and the read time, execution time, and write time of the second micro-op concurrently access the time-resource matrix 50 as one set of time for issuance of both micro-ops together.

Stated another way, a fused instruction has read/execute/read/execute/write times to access the time-resource matrix 50. The first read/execute is for first micro-op, the subsequent read/execute/write is for second micro-op. If any resource is not available then both micro-ops cannot be issued, the required time counts are incremented by 1, and the time-resource matrix 50 is checked as soon as the same cycle or next cycle.

Figure 4A:
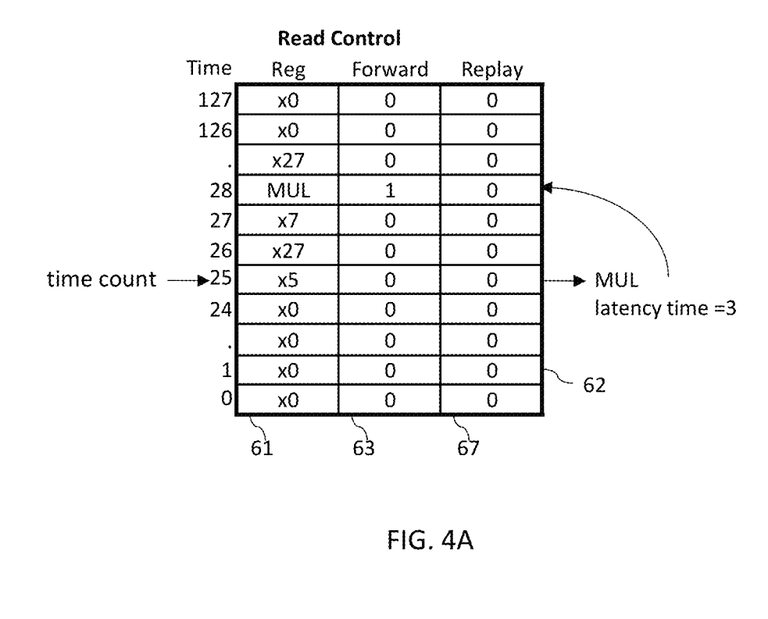
FIGS. 4A and 4B are block diagrams illustrating a read bus control and a write bus control operation.
Figure 4B:
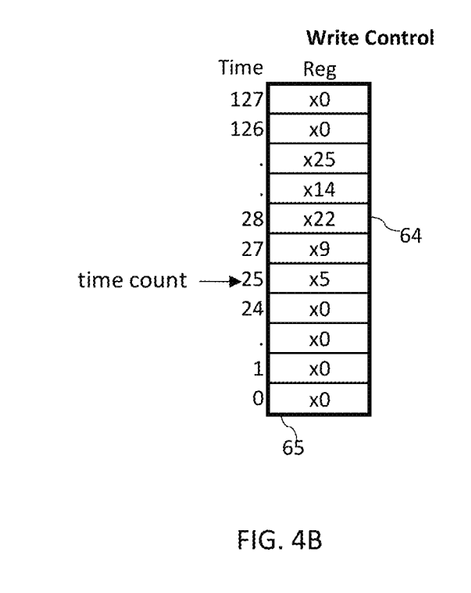

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represents the source registers 61, the forward bit 63, and the replay bit 67. The column in the write control unit 64 represents the destination registers in the write bus 65. In one embodiment, microprocessor 10 uses the RISC-V instruction set architecture. In that architecture, register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 include another column of valid bits (not shown) to indicate a valid read or write, respectively. When the time count is incremented from 24 to 25, the register fields 61 and 65 of row 24 are reset to x0 to indicate that those resources have been freed up. The register fields 61 and 65 of row 25 are reset to x0 when the count is incremented to 26 in the next cycle. FIGS. 4A and 4B shows a single read bus 66 and a single write bus 68, respectively. If 4 read buses and 3 write buses are implemented, then the functionality of FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44, instead of being written to a register in register file 60 and then being read from that register. There is thus no write that is required to an intervening register and this results in the write time of the first micro-op being the same as the read time of the second micro-op, so that the second functional unit receives the result of the first functional unit at the same time count. If the valid bit 42 is reset, then the data is read from the register file 60. If the valid bit 42 is set and the write time 46 is greater than the time count 90, then the instruction is replayed where the write time 46 is the read time for the replay instruction. To further explain, it should be understood that the write time in the register scoreboard 40 can change due to a data cache miss. In the example of FIG. 4A, the load instruction write back to x7 with data cache hit was set at time 27 but because of a cache miss was changed to time 42 in the register scoreboard. At time count 27, when a subsequent instruction reads x7, the register scoreboard 40 is checked to confirm that the write back is still valid at time 27 (write time equal to time count). If the write time is greater than the time count (write time was modified to 42), then the subsequent instruction is replayed at time 42. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x5 from the register field 65 of the write control unit 64 at time count of 25 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

In one embodiment, the source register field 61 includes either the register of the register file 60 or the identification of the functional unit which will forward data to the read port. The forward bit 63 is set if the source register field 61 contains the identification (ID) of the functional unit. If the forward bit 63 is set, then the read buses 66 use the functional unit ID stored in the source register field 61 for forwarding of result data from the functional unit. Instead of the source register, the register field 61 stores the ID of the functional unit which is referred to as the phantom register. As illustrated in FIG. 4A, the first micro-op is the multiply instruction and the second micro-op is the add instruction. In this case, the source operand of the add instruction is from the multiply instruction, so the multiply instruction should be in the register field 61. The read port control unit 62 is synchronized with the execution queue 70 so the source operand data is provided at the same time as the add instruction is dispatched from the execution queue 70, thus the add indication is from the execution queue 70 and not the read port control. The source operand of first micro-op is x5 and stores at time count 25. The latency time of the multiply instruction is 3 cycles, thus the second micro-op is stored at time count 28 with the forward bit 63 set and the multiply unit ID (MUL) is stored in register field 61. At time count 25, the read port control unit 62 also accesses entry 5 of the register scoreboard 40 to check the write time 46. If the write time 46 is greater than the time count 90, then the first micro-op is replayed. As with issuing a fused instruction, replaying the fused instruction accesses the time-resource matrix 50 at the same time for the first and second micro-ops to enable allocation of the resources for the required read/execute/read/execute/write operations. Both the first and second micro-ops of the fused instruction are dispatched to the replay execution queue. The read control unit 62 is responsible to set the replay bit 67 for the second micro-op. The first micro-op searches multiple read buses for a valid forward bit 63 and an ID of the multiply unit in the register field 61 at time 28. A match sets the replay bit 67 of the read control port 62 to 1. When the time count increments to 28, the second micro-op is canceled.

Figure 5:
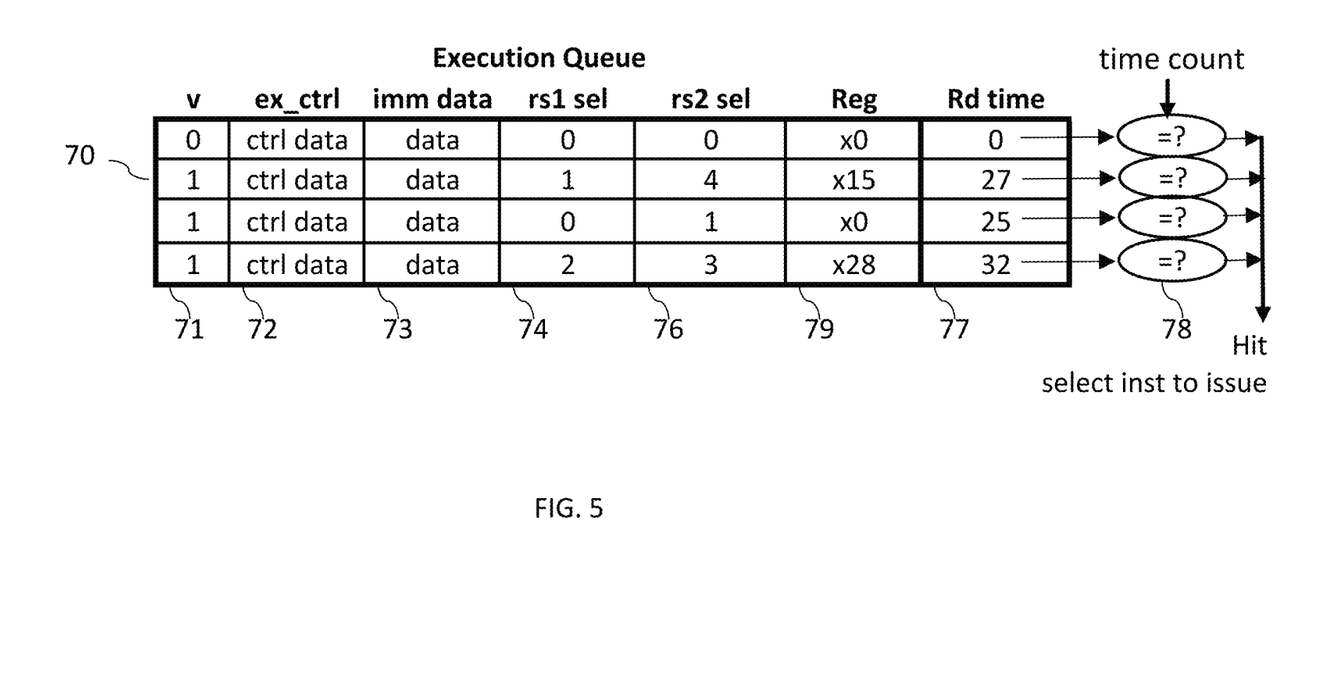
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, the extra source register 79, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. For a fused instruction, if the first micro-op is replayed, then the second micro-op is also replayed. The source operands for the first micro-op are known by the read control unit 62 but the source operand for the second micro-op is not known. The extra register field 79 keeps the source operand for the second micro-op in case the fused instruction must be replayed.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

Figure 6:
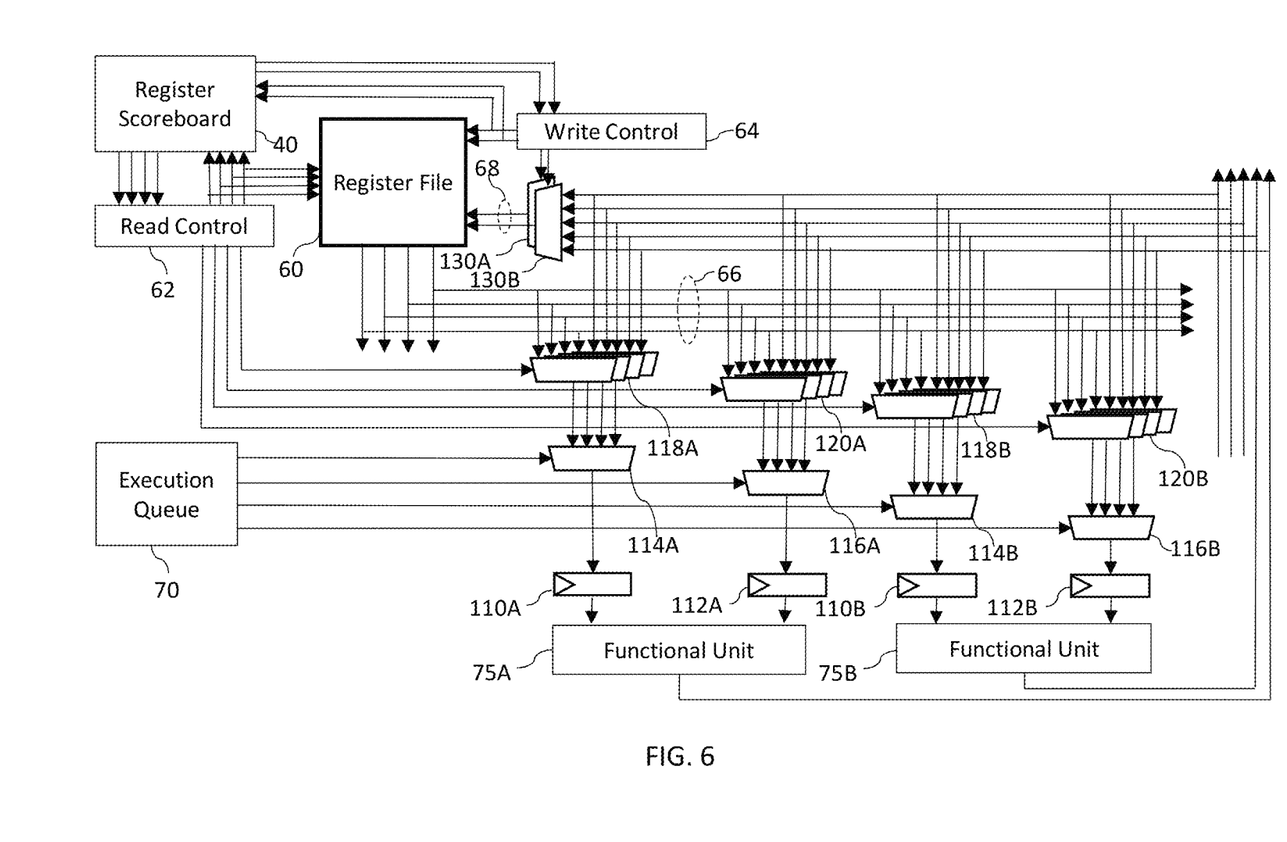
FIG. 6 is a block diagram illustrating a flow of executing two instructions without using a destination register and a write port to register file.

As shown in FIG. 1, the instruction issue unit 55 dispatches instructions to the execution queues 70 and sends control information to the read control unit 62 and write control unit 64 shown in further detail in FIG. 6. FIG. 6 illustrates the execution pipeline and control of instructions and fused instructions. The time count 90 is compared to the read times 77 of the execution queue 70 to dispatch an instruction to a functional unit 75. The execution queue 70 provides the first source register select 74 (FIG. 5) to the multiplexer 114A to select the first source operand data for the register 110A and the second source register select 76 to the multiplexer 116A to select the second source operand data for the register 112A. The functional unit 75A executes the instruction with the source operand data in the next cycle. The execution queue 70 is in synchronization with the read control unit 62 for the selected source registers.

The read control unit 62 provides the registers 61 (FIG. 4A) to the register file 60 to read and place data on the read buses 66. The read control unit 62 accesses the register scoreboard 40 using the same registers 61 (FIG. 4A) at the same time to enable the required two reads for the fused instruction. If the entries in the register scoreboard 40 are valid (valid bit field 42 of FIG. 3), then the write time 46 is compared to the time count 90 to forward data from the "Funit" field 44 or to replay the instruction from the execution queue 70. If the write time 46 matches the time count 90, then the "Funit" field 44 is used to select a functional unit to forward data through the multiplexer 118A for first read port and the multiplexer 120A for the second read port. In this example, the number of read ports is 4, so 4 multiplexers form each of the multiplexers 118A and 120A. The multiplexers 118A and 120A select forwarding data from one of the result data from functional units 75 or read data from the register file 60. The second set of multiplexers 118B, 120B, 114B, and 116B, and source operand registers 110B and 112B, and the functional unit 75B represents a second instruction being dispatched from the execution queue 70.

In FIG. 6 two functional units 75A and 75B are illustrated. As the 5 arrows at the right edge of FIG. 6 show, however, in a preferred implementation, there are 5 result data buses from 5 functional units in which the third, fourth, and fifth sets of the multiplexes, source operand registers and functional units are replicated, but not illustrated. When the functional unit 75A generates result data, the write control unit 64 is in synchronization with the functional unit 75 to write data to the register 65 (shown in FIG. 4B) of the write control unit 64 coupled to the register file 60. The write control unit 64 accesses the register scoreboard 40 at the same time as it writes to registers 65. The functional unit field 44 of the register scoreboard 40 is used as a select signal for the multiplexer 130A and 130B to select result data of a functional unit 75. In this example, the number of write ports is 2, so there are 2 multiplexers 130A and 130B to select data from the functional units 75 to write to the register file 60.

In one embodiment, the first micro-op of the fused instruction is dispatched from the execution queue 70 to the first set of "A" multiplexers, source registers, and functional unit 75A. The result data from the functional unit 75A is forwarded to the second micro-op through the second set of "B" multiplexes, source registers, and functional unit 75B. At the time count for the second micro-op, the read control unit 62 has the forward bit 63 set and has the ID of the functional unit 75A in the register field 61. The read control unit 62 selects the result data from the functional unit 75A to send to the second source operand 112B through the multiplexers 120B and 116B. The first micro-op does not set any entry in the write control unit 64, so the result data from functional unit 75A is not selected for writing into the register file 60.

The multiply-accumulate instruction is used as example for a fused instruction. It is of course, merely an example of a fused instruction and is not intended to be limiting. For example, a load and add instruction can be used, or more than two instructions can be fused.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a time counter storing a time count representing a current time of the processor, wherein the time count is incremented periodically;
an instruction issue unit coupled to the time counter for receiving a first fused instruction comprising a first operation that corresponds to a first instruction and a second operation that corresponds to a second instruction, wherein result data of the first operation are forwarded to the second operation without being stored in an intervening register, and issuing the first fused instruction with a preset execution time based on the time count; and
an execution queue coupled to the time counter and the instruction issue unit to receive the first fused instruction from the instruction issue unit, and dispatch the first operation to a first functional unit when the preset execution time of the first operation corresponds to the time count and dispatch the second operation to a second functional unit when the preset execution time of the second operation corresponds to the time count, and wherein the result data from the first functional unit is forwarded to the second functional unit.

2. The processor of claim 1 wherein:
the processor includes a clock circuit, and the time counter increments the time count with each clock cycle; and
the preset execution time is correlated to the time count based upon the clock cycle.

3. The processor of claim 2 wherein:
the time counter comprises an N-bit counter that counts to a maximum time count that represents a largest future time for the instruction issue unit to issue an instruction; and
the N-bit counter wraps around to a zero count after reaching the maximum time count.

4. The processor of claim 3 further comprising:
a register scoreboard storing a write time of a first register in a register file, wherein the write time is a future time based on the time count.

5. The processor of claim 4 further comprising;
an instruction decode unit coupled to the register scoreboard;
wherein the instruction decode unit reads from the register scoreboard a write time for source each source operand of the first instruction and uses each write time to determine an execution time for the first instruction.

6. The processor of claim 5 further comprising:
a time-resource matrix unit coupled to the register scoreboard and the time counter for storing information relating to available resources for each time count of the N-bit counter; and
wherein the available resources include at least one of: a plurality of read buses, a plurality of write buses, and a plurality of functional units.

7. The processor of claim 6 wherein the instruction issue unit is coupled to the time resource matrix unit to receive data therefrom to issue an instruction if all the resources from the time-resource matrix are available, and to stall the instruction if any of the resources is not available.

8. The processor of claim 2 further comprising;
a read control unit comprising a plurality of entries that each specify a source register of a register file and a forwarding valid bit, one of the entries specifying a source register for the second instruction and wherein the forwarding valid bit that corresponds to the second instruction specifies if data is to be supplied from the source register for the second instruction or to be forwarded by the first functional unit.

9. The processor of claim 8 wherein each of the entries of the read control unit further comprises a replay bit to indicate cancelation and replay of a corresponding instruction.

10. The processor of claim 8 further comprising;
a write control unit comprising a plurality of entries that each specify a destination register of the register file at an assigned time count, one of the entries specifying the destination register of the register file to receive result data from the second functional unit.

11. The processor of claim 10 wherein the execution queue stores a plurality of instructions wherein each instruction includes a read time which is a future time based on the time count.

12. The processor of claim 11 wherein the read bus control nit is synchronized with the read time in the execution queue.

13. The processor of claim 10 wherein the execution queue dispatches instructions to at least one functional unit.

14. A processor comprising:
a clock circuit;
a time counter storing a time count representing a current time of the processor, wherein the time count is incremented with each cycle of the clock circuit;
an instruction issue unit, coupled to the time counter, that receives a first fused instruction and that issues the first fused instruction with a preset execution time based on the time count, wherein the first fused instruction comprises a first operation and a second operation wherein result data of the first operation are forwarded to the second operation;

an execution queue, coupled to the time counter and the instruction issue unit, to receive the first fused instruction from the instruction issue unit, and dispatch the first operation to a first functional unit when the preset execution time of the first operation is correlated to the time count and to dispatch the second operation to a second functional unit when the preset execution time of the second operation is correlated to the time count wherein the result data from the first functional unit is forwarded to the second functional unit;

a register scoreboard storing a write time of a each register of a plurality of registers in a register file, wherein the write time is a future time based on the time count;

an instruction decode unit coupled to the register scoreboard, wherein the instruction decode unit reads a write time for each source operand of the first operation of the first fused instruction from the register scoreboard, and uses each write time to determine the preset execution time for the first fused instruction;

a time-resource matrix, coupled to the register scoreboard and the time counter, that stores information relating to available resources for each time count of the time counter; and wherein the available resources include at least one of: a plurality of read buses, a plurality of write buses, and a plurality of functional units.

15. A method for issuing a fused instruction with a first operation and a second operation to an execution queue in a processor to execute at a future time wherein the result data of the first operation is forwarded to the second operation without writing to a register of a register file and wherein the future time is time based on a time count from a time counter which is incremented with each cycle of a clock circuit.

16. The method of claim 15 wherein a maximum time count value that the time counter can reach corresponds to a latest future time at which an instruction of the processor is able to be issued.

17. The method of claim 16 further comprising:
storing a write time of the register wherein the write time is a future time based on the time count.

18. The method of claim 17 further comprising:
storing information corresponding to available resources for each time count in a time-resource matrix, wherein the resources comprise at least one of a plurality of read buses, a plurality of write buses, and a plurality of functional units.

19. The method of claim 18 further comprising:
causing the result data of the first operation to be forwarded to the second operation without writing to the register of the register file based on a forwarding valid bit stored in an entry of a read control unit wherein the entry specifies a source register of the register file to provide data for the second operation.

20. The method of claim 19 further comprising:
writing result data of the second operation to a destination register of the register file, wherein the destination register is specified to be written at a specified time count by a write control unit.

21. The method of claim 15 further comprising storing a plurality of instructions in an execution queue wherein each of the instructions includes a read time based on the time count.

22. The method of claim 21 wherein the read time is provided by a read control unit that controls transport of data on one or more read buses.

23. The method of claim 19, wherein the execution queue is configured to dispatch instructions to a single functional unit or to multiple functional units.

* * * * *